United States Patent [19]

Smith

[11] Patent Number: 4,964,032

[45] Date of Patent: Oct. 16, 1990

[54] MINIMAL CONNECTIVITY PARALLEL DATA PROCESSING SYSTEM

[76] Inventor: Harry F. Smith, 7 Fern La., Newtown, Conn. 06470

[21] Appl. No.: 270,850

[22] Filed: Nov. 14, 1988

Related U.S. Application Data

[62] Division of Ser. No. 31,035, Mar. 27, 1987.

[51] Int. Cl.[5] .............................................. G06F 9/00
[52] U.S. Cl. ................................ 364/200; 364/228.2; 364/231.9
[58] Field of Search ... 364/200 MS File, 900 MS File

[56] References Cited

U.S. PATENT DOCUMENTS

| | | | |
|---|---|---|---|
| 4,270,169 | 5/1981 | Hunt et al. | 364/200 |
| 4,365,292 | 12/1982 | Barnes et al. | 364/200 |
| 4,435,758 | 3/1984 | Lorie et al. | 364/200 |
| 4,471,483 | 9/1984 | Chamberlain | 371/21 |
| 4,799,154 | 1/1989 | Matthews et al. | 364/200 |

OTHER PUBLICATIONS

Greenshields, Ian, "Dynamically Reconfigurable Vector-Slice Processor", I.E.E. Proceedings Section AAI, vol. 129 (1982), Sep., No. 5, pp. 207-215.

Lee et al., "A Partitionable and Reconfigurable Multicomputer Array", Proceedings of the 1983 International Conference on Parallel Processing, Aug. 23-26, 1983, IEEE, pp. 506-510.

Duff, M.J., "Review of the Clip Image Processing System", National Computer Conference, 1978, pp. 1055-1060.

Primary Examiner—Gareth D. Shaw
Assistant Examiner—John G. Mills

[57] ABSTRACT

A parallel data processing system comprises a control data processor and a plurality of processing planes, each of the planes comprising a plurality of data processing cells. Each of the cells within a plane is communicatively coupled to adjacent, coplanarly disposed cells and, in addition, is communicatively coupled to a corresponding cell disposed in an overlying processing plane and to a corresponding cell disposed in an underlying processing plane. The control data processor is coupled to each of the cells within a given plane in a manner which provides for simultaneous communication with each of the cells within the plane. Each of the cells within a plane is provided with an output status signal operable for being combined with the output status signals from other cells within the plane to provide an input signal to the control data processor. The status signal may be expressive, when asserted, a processing state common to all of the cells within the plane, thereby facilitating the operation of the control data processor in controlling a flow of data between adjacent processing planes, in initiating a desired processing sequence within a given plane, and in assuring the reception of data transmitted to the cells.

2 Claims, 13 Drawing Sheets

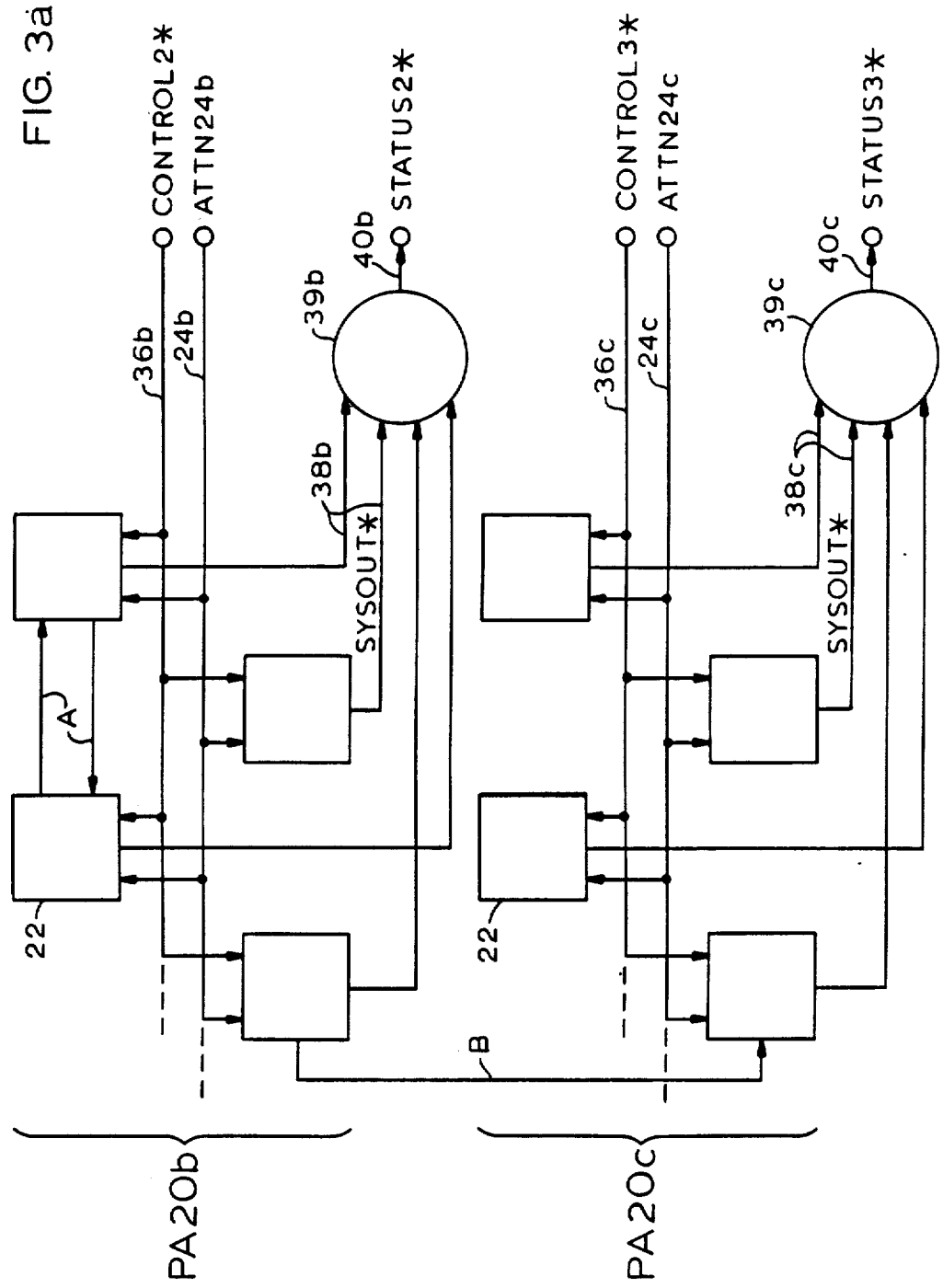

| NUMBER OF ASSERTIONS OF CONTROL∗ 36 | | COMMAND |
|---|---|---|
| | 1 | TRANSFER RESULT TO ADJACENT PLANE |
| | 2 | TRANSFER RESULT TO TOP CELL |
| | 3 | TRANSFER RESULT TO BOTTOM CELL |
| | 4 | TRANSFER RESULT TO RIGHT CELL |
| | 5 | TRANSFER RESULT TO LEFT CELL |
| | 6 | RECEIVE DATA FROM HOST |
| | 7 | SWAP PARTIAL RESULT WITH ALL ADJACENT CELLS |
| | 8 | • |
| | 9 | • |

FIG. 10

MINIMAL CONNECTIVITY PARALLEL DATA PROCESSING SYSTEM

This is a division of co-pending application Ser. No. 07/031,035 filed on Mar. 27, 1987.

FIELD OF THE INVENTION

The present invention relates to data processing systems and, in particular, to a parallel data processing system comprised of one or more processing planes, each of the planes being comprised of a two dimensional array of data processing elements, or cells.

BACKGROUND OF THE INVENTION

Parallel data processing systems, or parallel processors, are widely utilized for computing applications which require that a substantially large amount of data be processed in a relatively small duration of time. Examples of such applications are real-time applications such as those required for image reception and recognition systems, seismic systems, and control systems adapted for controlling a device in response to a plurality of sensor input signals. Other applications include mathematical and physical science research, meteorology, and artificial intelligence systems.

A particular problem associated with known parallel processing systems is the complexity of the required interconnection of discrete processing elements and the interconnection of the individual processing elements with a central controlling processing element. A desirable goal in the design of such processors is the optimization of this interprocessor connectivity in that the nature of the connectivity typically affects the overall processing speed, efficiency, and ease of use of the system, Related to this problem of connectivity optimization are constraints imposed by the expense and technical complexity of achieving the most optimal connectivity between the system processing elements.

In accordance with the invention there is disclosed a method for use in a parallel data processing system whereby individual processing elements or cells of an array of processing elements determine their position within the array, In an illustrative embodiment of the invention a parallel data processing system is comprised of at least a two dimensional array of data processing cells, each of the cells comprising a plurality of input and output communication signal lines for electrically coupling to at least all immediately neighboring cells. The method includes the following steps.

For at least one cell disposed at a predetermined position along a boundary of the array the cell has at least two cell input communication signal lines coupled to a predetermined logic state. A step initiates an input signal line logic state determination processing state within all of the cells of the array and a further step detects by the at least one cell at the predetermined position the predetermined logic state. For the cell so detecting the predetermined logic state the method includes a step of determining from the detected predetermined logic state that the cell is located at the predetermined position within the array.

For the cell so determining its position at the predetermined position within the array the method includes a step of communicating an identification of the predetermined position to at least one other neighboring cell whereby the neighboring cell so communicated to is enabled to determine its position within the array relative to the predetermined position.

The invention also teaches a method of verifying the operational integrity of an array of data processing cells by transmitting a position of at least one of the cells to a control data processor. The control data processor compares the transmitted position to a known position. If the two positions are not in agreement the control data processor determines that at least one cell of the array is inoperable to determine its position within the array and/or to communicate position information with a neighboring cell.

BRIEF DESCRIPTION OF THE DRAWINGS

These and other aspects of the present invention will be made apparent by the following detailed description of various embodiments of the invention taken in connection with the drawing, wherein:

FIG. 3a is a stylized block diagram showing the communication between processing cells disposed within a processing plane and also the communication with processing cells disposed within an adjacent plane;

FIG. 10 is a table illustrating one possible set of control information in accordance with the protocol of FIG. 9a;

DETAILED DESCRIPTION OF THE INVENTION

Figure 1:
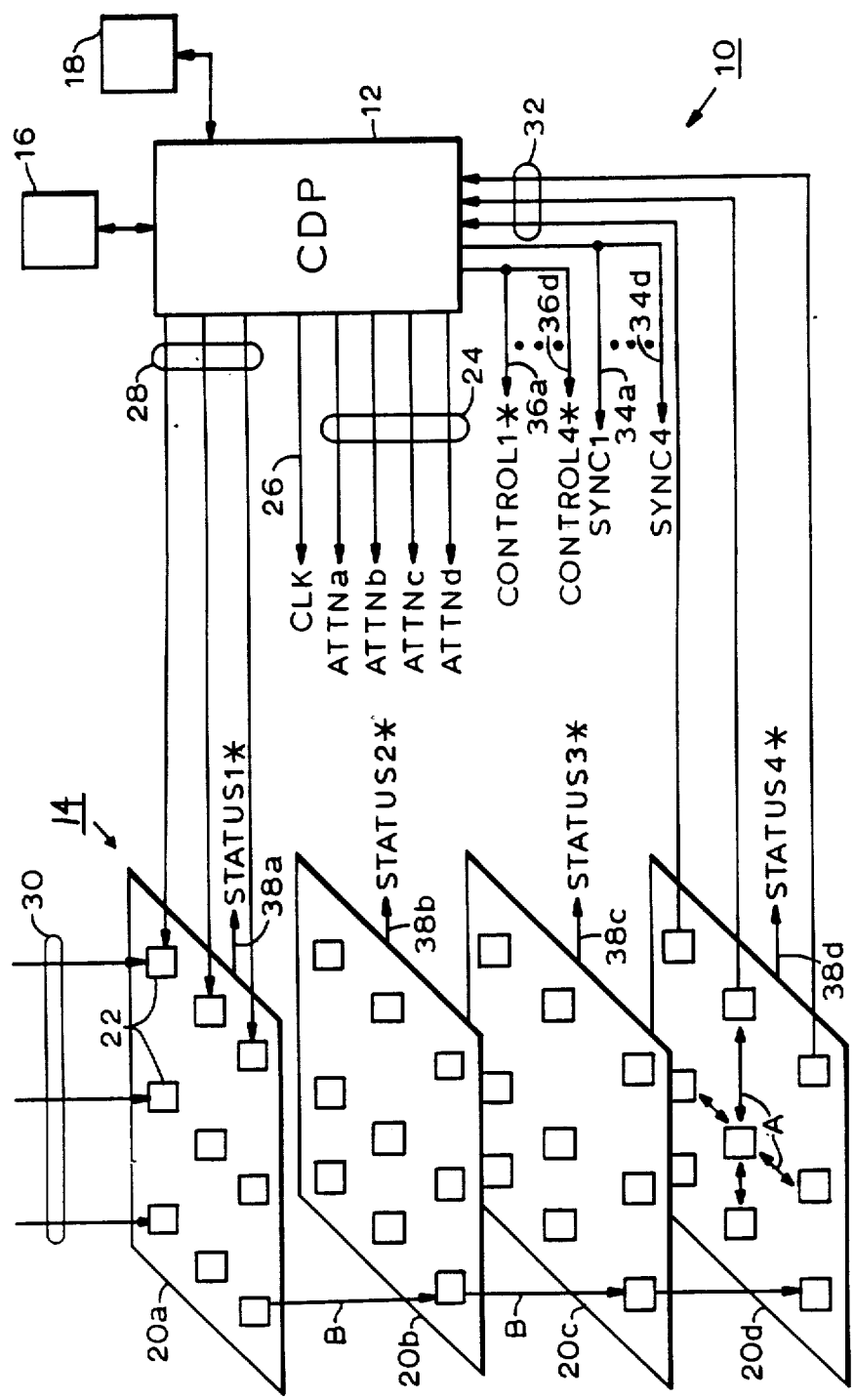
FIG. 1 is a stylized block diagram showing a parallel data processing system constructed in accordance with the invention.

Referring now to FIG. 1 there is shown in stylized form a parallel data processing system (PDPS) 10 constructed in accordance with one embodiment of the invention. System 10 is comprised of a control data processor (CDP) 12 having a plurality of input and output lines for coupling the CDP 12 to a processing structure (PS) 14. CDP 12 may also have input and output lines coupled to a data display and data input device 16, which may comprise a familiar CRT display and a keyboard. CDP 12 may also have input and output lines coupled to a program and data mass storage device 18, such as a removable or a fixed magnetic disk.

CDP 12 may be a microcomputer system, or a personal computer, or a mini or mainframe computer. In general, CDP 12 operates to execute a control program which controls the flow and processing of data within the PS 14.

PS 14 is comprised of a plurality of processing planes, or processing arrays (PA's) 20a, 20b, 20c and 20d. Although four such arrays are shown, it should be realized that PS 14 may be comprised of from one to some arbitrarily large number of arrays. In referring to the processing arrays herein, they may be referred to individually as, for example, PA 20a, or collectively as PA 20.

Each PA 20 is comprised of a plurality of processing elements, or cells, 22. The cells 22 may be arranged in rows and columns in a regular two dimensional array of processing cells; however other cell layout topologies, such as a tree structure, are within the teaching of the present invention. Each of the cells 22 may be comprised of a "single-chip" type of microprocessor device. For example, each of the cells 22 may be a microprocessor such as a MC68705 type of microprocessor device manufactured by Motorola Incorporated. This microprocessor is fully described in the publication *MOTOROLA MICROPROCESSOR DATA MANUAL*, and the set of programming instructions is fully described in the publication *M6805 HMOS M146805 CMOS FAMILY MICROCOMPUTER/MICROPROCESSOR USER'S MANUAL*, second edition, 1983. Both of the aforementioned publications are published by Motorola, Inc.

This microprocessor is characterized as having internal memory for the nonvolatile read-only storage of program instruction data and internal volatile memory for the read-write storage of data and system operating parameters. The microprocessor is also characterized as having a plurality of programmable input/output (I/O) lines for interfacing to external devices and circuitry.

Although the illustrative embodiment of the invention presented herein will refer to such a member of the MC6805 family, it should be realized that a number of currently available microprocessors from a number of different manufacturers may also be equally well suited for use in a system constructed in accordance with the invention. It should be further realized that the invention is not limited to use with such "single-chip" microprocessor devices, but may be equally well realized by processing cells 22 comprised of microprocessor systems having external ROM, RAM and I/O devices. The teaching of the invention may also be used with processing cells 22 comprised of individual data processing systems, such as personal computers.

As can be seen in FIG. 1, CDP 12 has a plurality of attention lines (ATTN1-ATTN4) 24 each of which is coupled to the cells 22 within a corresponding PA 20. CDP 12 may also has a master clock output 26 which provides a clock signal of a proper duty cycle and pulse width to each of the cells 22 within the PS 14. In the illustrative embodiment the clock signal has a frequency of approximately four megahertz and a duty cycle of approximately 50 per cent. Of course, it is also possible to generate such a clock within each PA 20 or even within each cell 22, if the device chosen to implement the cell has such internal clock generation facilities. One advantage to be gained by providing a master clock from the CDP 12 is that overall synchronization of the PS 14 may be more readily achieved.

In addition, CDP 12 may have a plurality of data output lines 28 for conveying input data to a plurality of cells 22 along a given edge of an array, such as the the topmost PA 20a. Alternately, or in conjunction therewith, each of the cells 22 of a given array may be provided with data from another source of data, such as an array of radiation or sonic sensors, via a plurality of external data lines 30. CDP 12 may also have a plurality of data input lines 32 for receiving data from a plurality of cells 22 along a given edge of a given array, such as the bottommost PA 20d.

In the illustrative embodiment shown in FIG. 1, CDP 12 also has as output signals a plurality of PS synchronization signals (SYNC) 34a-34d and a plurality of PS control signals (CONTROL*) 36a-36d. CDP 12 also has, in accordance with the invention, a plurality of PA status (STATUS*) input lines 38a-38d, the purpose and use thereof will be described in detail hereinafter.

Figure 2:
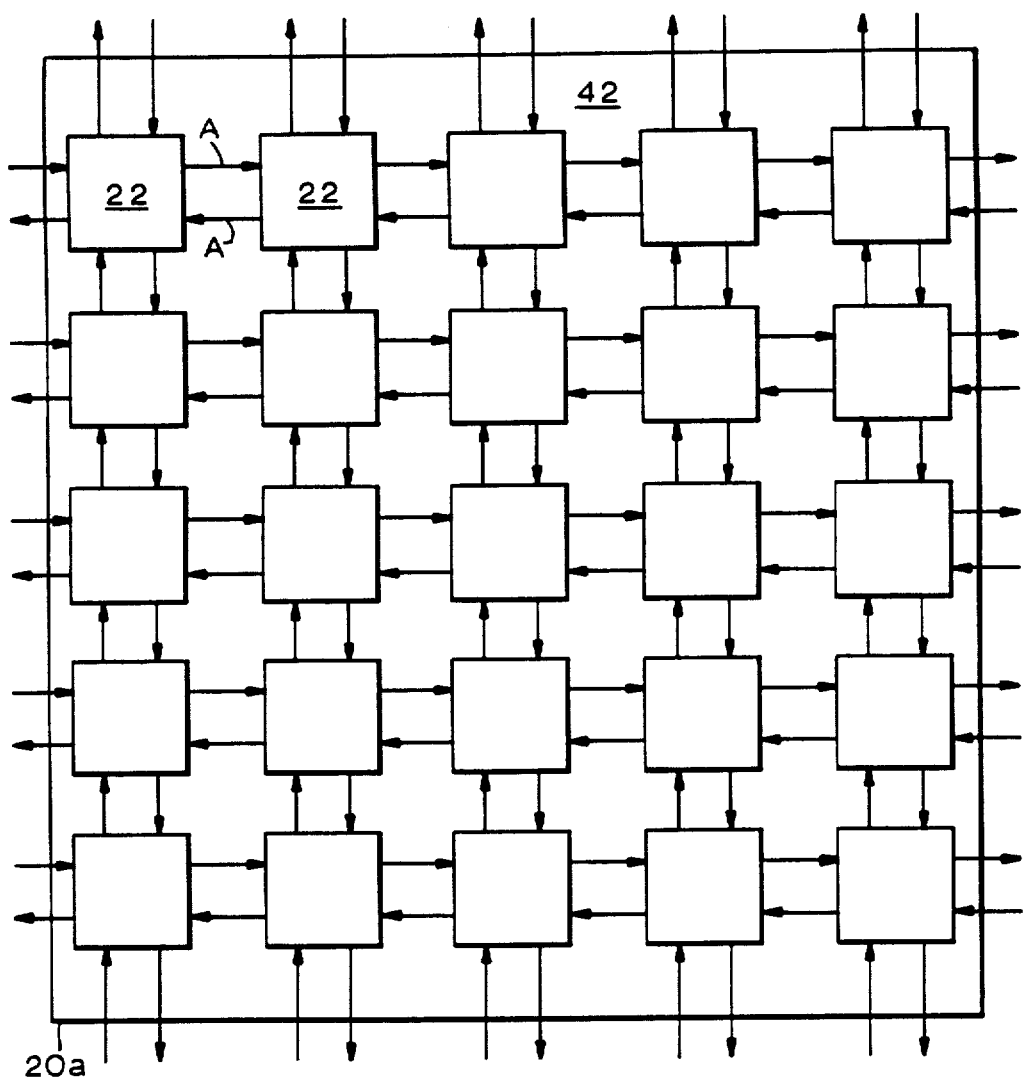
FIG. 2 is a diagrammatical representation of the data flow of the inter-processing cell communications network which is one feature of the invention.

Referring now to FIG. 2 there is shown, by example, the PA 20a. PA 20a is comprised of a plurality of cells 22 disposed in a regular two dimensional array. Each cell 22 is operable for communicating with two or more adjacent cells in the manner as depicted by the arrows A. The cells 22 may be disposed upon the surface of a common substrate 42, such as a printed circuit board. Substrate 42 is operable for distributing power and signal conveying conductors to each of the cells 22 in a well known manner.

Although the PA 20a is shown to be comprised of 25 cells, it should be realized that the number of cells may be more or less than 25. It should further be realized that an arbitrary number of PA 20a's may be coplanarly disposed to yield a larger array of cells 22, the coupling between arrays being accomplished by suitable connectors which couple the cells along adjacent edges of each array one to another. In other embodiments of the invention (not shown), each of the cells 22 may be disposed upon a discrete substrate, each of which is mated to a suitable backplane structure in order to distribute the power and signal conductors between the cells in order to implement a data flow pattern as shown in FIG. 2.

Referring now to FIG. 3a there is shown in block diagram form a portion of the PA 20b and the PA 20c. As may be seen, each cell 22 within an array communicates with adjacent cells in the manner depicted by the arrows A. Communication with cells 22 in an adjacent array is in the manner depicted by the arrows B. In the illustrative embodiment of the invention the flow of data through the PS 14 is in a unidirectional downwards direction from a given PA 20 to an underlying PA 20. It should be realized, however, that the flow of data may occur in an upwardly directed manner from a given PA 20 to an overlying PA 20. It is also within the scope of the invention to provide for bidirectional data flow between adjacent PA 20's. The particular nature of the data flow is, typically, application specific and may be related to such application specific parameters as the type of data processing being performed or the number of cell 22 I/O lines available for communication functions.

As may be further seen in FIG. 3a, the cells 22 within PA 20b and PA 20c are coupled in common to the ATTN 24b and ATTN 24c signal lines, respectively. One purpose of the ATTN 24 signal is to invoke a specific processing state or condition within each of the cells within a given array, as will be described in detail below. Each ATTN 24 signal line may further be used in conjunction with a corresponding CONTROL* 36 signal line to specify a desired processing or data transfer task to be performed by each of the cells 22 within a given PA 20.

Figure 3B:
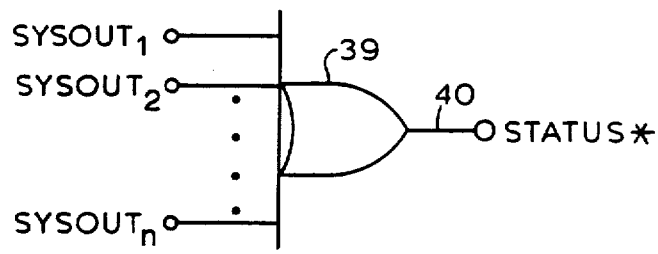
FIG. 3b is a circuit diagram showing one circuit operable for generating a processing plane status signal which is a further feature of the invention.

It may further be seen in FIG. 3a that each cell 22 within PA 20b and 20c have an output signal SYSOUT* 38. The SYSOUT* 38 signal lines of a given PA 20 are coupled together in a manner which provides for the generation of a STATUS* 40 output signal. Each STATUS* 40 signal is expressive of a processing state which is common to all of the cells 22 within a given PA 20. As can be seen in FIG. 3b, one method of coupling together the SYSOUT* 38 signals of a given PA 20 is by providing a logic OR function generator 39 having a plurality of inputs the number of which corresponds to the number of cells 22 within a given PA 20. For example, generator 39 may have inputs SYSOUT$_1$ through SYSOUT$_n$, where n=25 for a PA 20 of the illustrative embodiment. Generator 39 has as an output STATUS* 40 which is coupled to the CDP 12. As can be appreciated, if one or more of the cells 22 within a given PA 20 have a SYSOUT* 38 signal which is a logical one, then STATUS* 40 will also be a logical one. Only when all of the SYSOUT* 38 signals are at a logical zero state will the STATUS* 40 signal be at a logical zero state. Thus, by controlling the state of their respective SYSOUT* 38 signals the cells 22 may notify the CDP 12 of a processing state which is common to all of the cells 22 within the given PA 20. For example, if the cells 22 maintain their respective SYSOUT* 38 signals in a logical one state during the execution of a processing task and, at the completion of the task change the state of their respective SYSOUT* 38 signals to a logical zero, the state of the STATUS* 40 signal associated with the PA 20 will be expressive of the completion of the processing task by all of the cells 22 of the PA 20. Of course, the STATUS* 40 signal may be generated by any of a number of suitable means, such as by connecting together directly the respective SYSOUT* 38 signals if the signals are of an open-collector or open-drain type of output. Similarly, if the logic state of STATUS* 40 is defined to be a logic one to indicate the processing state common to all of the cells 22 then an AND logic generator may be employed, each of the cells 22 correspondingly maintaining SYSOUT* 38 at a logic zero state and subsequently raising the signal to a logic one.

In order to further point out the advantages made possible by the apparatus and methods of the invention, an illustrative example will now be given. As an aid in understanding the example, reference will now be made to FIGS. 4–8. In addition, the following conventions will be followed. A logic one, or high, is deemed to be a voltage potential of greater than 2.5 volts, typically in the range of 4.75 to 5.25 volts. A logic zero, or low, is deemed to be a voltage potential of less than 2.5 volts, typically zero to less than 1.0 volt. A logic signal is deemed to be true, or asserted, when low if the signal name is followed by an "*". A logic signal is deemed to be true, or asserted, when high if the signal name is not followed by an "*". For example, the signal CONTROL* is deemed to be asserted when in a logic zero state and deasserted when in a logic one state. The signal ATTN is deemed to be asserted when high and deasserted when low. Some signals, such as DATA, convey information when either in a high or low state are thus not considered to be asserted in either state.

Figure 4:
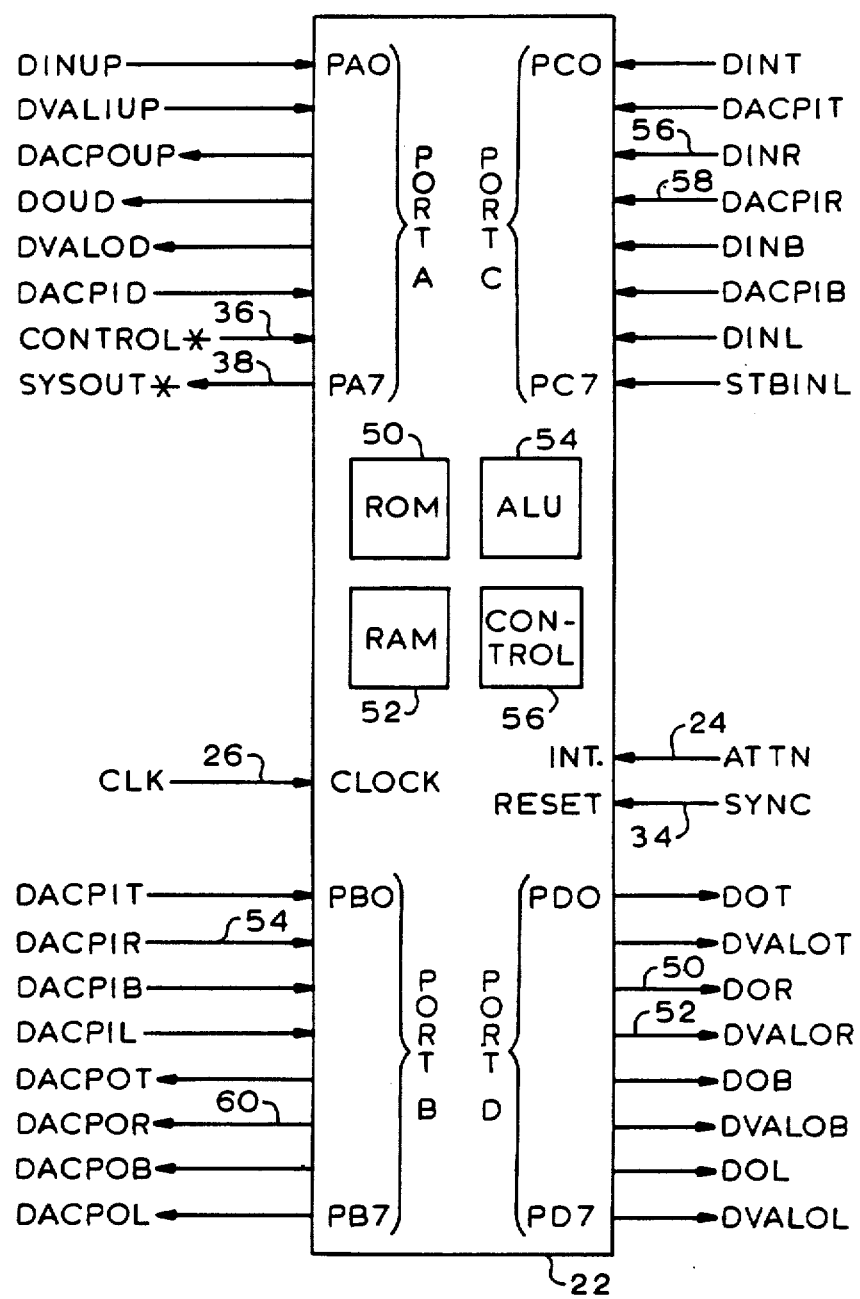
FIG. 4 is a block diagram showing a representative one of the processing cells.

Referring now to FIG. 4 there is shown a representative one of the cells 22. Cell 22 comprises, typically, a microprocessor device having internal read only memory (ROM) program storage 50, random access memory (RAM) data storage 52, an arithmetic/logic unit (ALU) 54, and control logic 56 operable for decoding the program data and executing the instructions contained therein. Cell 22 further comprises a plurality of input/output (I/O) lines which may be organized in byte fashion into four I/O ports, namely ports A through D. In general, each of the I/O lines may be programmed as either an input or an output line. In addition, the cell 22 comprises a reset input, which can be seen to be connected to one of the SYNC 34 outputs of CDP 12, a clock input connected to CLK 26, and an interrupt input connected to one of the ATTN 24 outputs of CDP 12.

SYNC 34 being asserted causes each of the cells 22 within a given PA 20 to be reset, the reset condition being sustained until the SYNC 34 signal is deasserted. The deassertion of SYNC 34 initiates the execution of an initialization software routine within each of the cells 22. It can be appreciated that the assertion and subsequent deassertion of SYNC 34 may be employed to terminate the data processing activity of a PA 20 and/or place each of the cells 22 within a given PA 20 within a known processing state, such as an idle processing state.

Figure 5C:
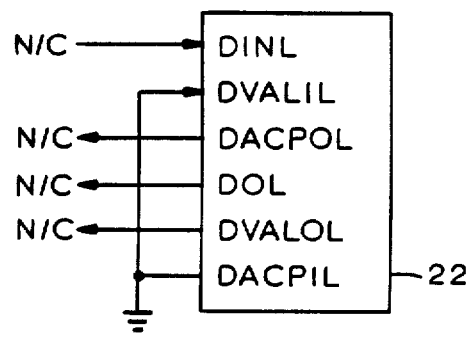
FIG. 5c is a block diagram showing one method of terminating certain processing cell communications signals for those cells disposed along an edge of a processing plane.
Figure 5A:
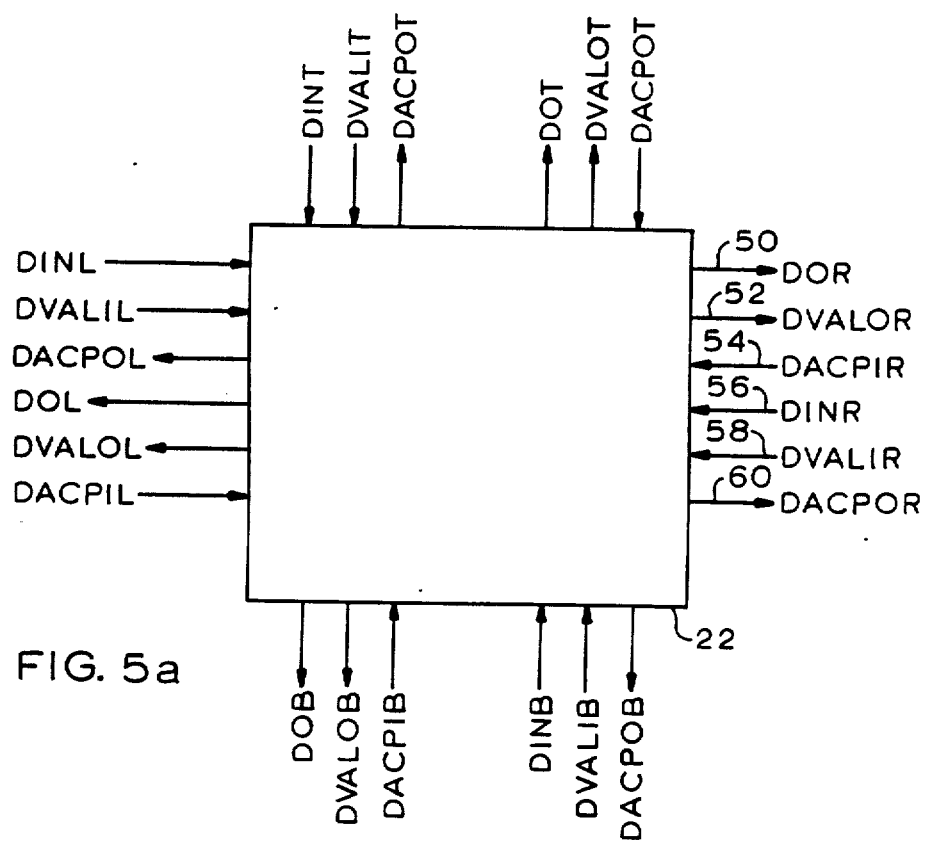
FIG. 5a is a block diagram of a representative one of the processing cells.

Referring now to FIG. 5a, there is shown a typical cell 22 and a portion of the intercell communications lines associated therewith. As can be seen, the communication lines are organized into four groups, each of the four groups being operable for communicating with an adjacent coplanar cell. Although not illustrated in FIG. 5a, it should be realized that each such cell 22 may be further provided with similar communication lines for communicating with corresponding cells in an overlying and an underlying processing plane.

The signal name convention which will be followed in the ensuing description is based on the assumption that if a typical PA 20 is turned vertically on edge that a cell 22 within the center of the array will have an adjacent cell disposed to the top, right, bottom and left sides. Each group of intercell communication lines is comprised of, for example, a Data Output Right (DOR) 50, Data Valid Output Right (DVALOR*) 52, Data Accepted Input Right (DACPIR*) 54, Data Input Right (DIR) 56, Data Valid Input Right (DVALIR*) 58 and a Data Accepted Output Right (DACPOR*) 60.

Figure 5B:
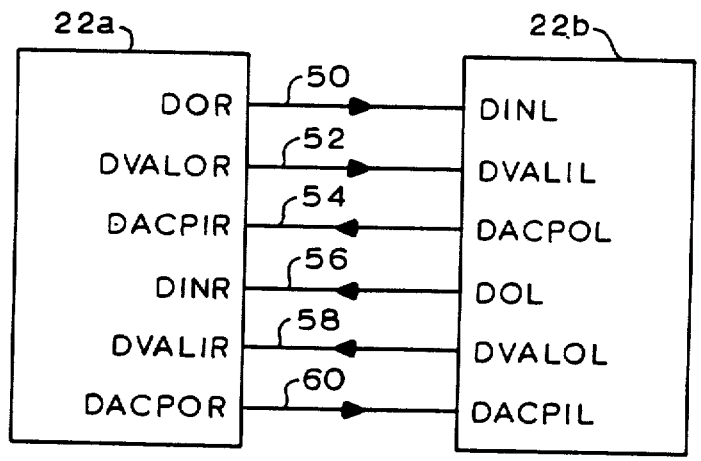
FIG. 5b is a block diagram showing the interconnection of two adjacent processing cells.
Figure 7:
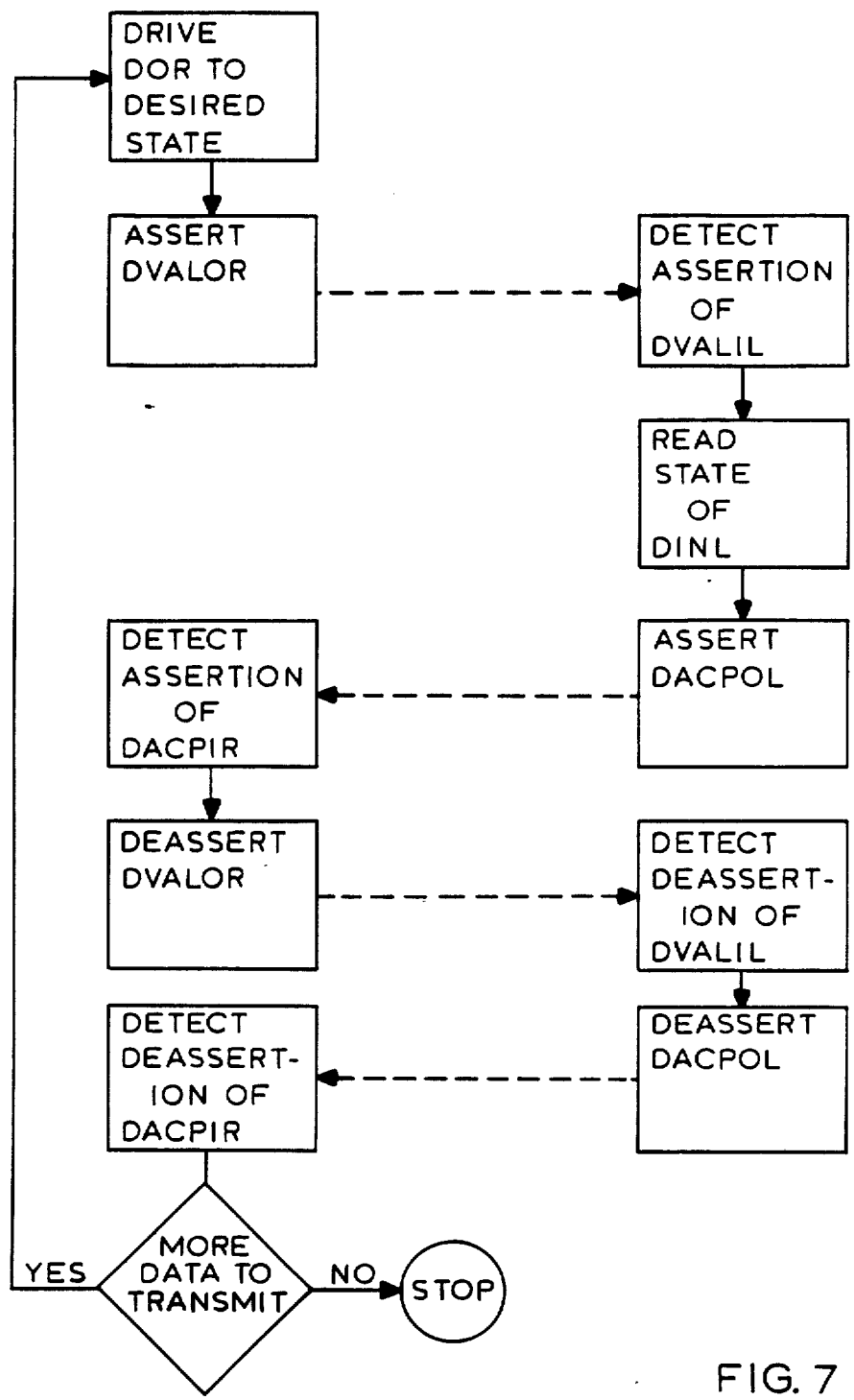
FIG. 7 is a flowchart illustrating the programming instructions which implement the inter-processing cell communications.

Referring now to FIG. 5b it can be seen how these signal lines are coupled to an adjacent cell 22b, the direction of data flow being indicated by the arrows. As can be seen, the DOR 50 signal is coupled to the Data Input Left (DIL) input of the adjacent cell 22b.

For those cells 22 disposed adjacent to an edge of a PA 20, the communication signal lines may be configured as shown in FIG. 5c, that is, those inputs which are defined to be active low may be coupled to circuit ground to provide a constant low signal. The purpose of so connecting these input lines will become apparent hereinafter.

Figure 6:
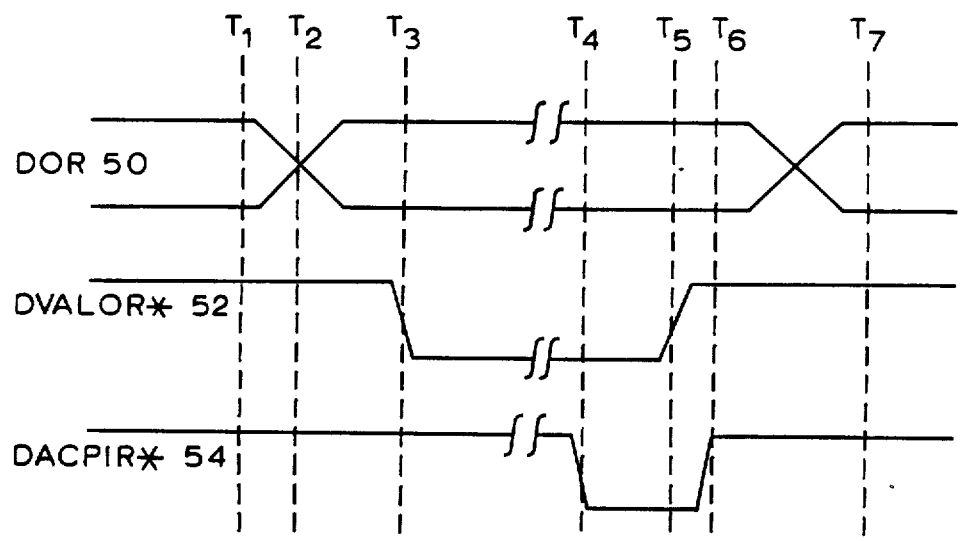
FIG. 6 is diagram showing representative waveforms illustrative the transmission of a data bit between two processing cells.

Referring now to FIG. 6 there is shown, by way of example, representative waveforms which describe the transmission of a single bit of data from the cell 22a to the cell 22b of FIG. 5a. As can be seen, at time T1 prior to the transmission of the bit of data DOR 50 may be either in a high or low state, DVALOR* 52 is deasserted, as is DACPIR* 54. At T2 cell 22a drives DOR 50 to either a high or low state, depending upon whether it is desired to transmit a logical one or a logical zero data bit. At time T3 cell 22a asserts DVALOR* 52, indicating to cell 22b that valid data is present on cell 22b's DIL input signal line. Of course, cell 22a may assert DVALOR* 52 simultaneously with driving DOR 50. Some indeterminate amount of time subsequent to cell 22a asserting DVALOR* 52 cell 22b will detect that the DVALIL* signal line is asserted, and will read the DIL signal line in order to receive the data bit. Cell 22b will subsequently, at time T4, assert its DACPOL* signal line, which assertion will be detected by cell 22a at its DACPIR* 54 signal line. The assertion of DACPIR* 54 indicates to cell 22a that cell 22b has received the data bit present on DOR 50. At time T5 cell 22a deasserts DVALOR* 52, terminating the transmission of the data bit. Cell 22b detects that its DVALIL* signal line is deasserted and thereafter deasserts, at T6, DACPOL*, which is detected by cell 22a as DACPIR* 54 being deasserted. Cell 22a may thereafter transmit another data bit by placing DOR 50 in a desired state, such as at T2, and repeating the sequence described above. At time T7 the state of DOR 50 is immaterial unless DVALOR* 52 is asserted. The above described data transmission sequence is, typically, performed by each cell 22 within a PA20 when communicating with adjacent coplanar cells and also when communicating with corresponding cells in adjacent arrays.

In other embodiments of the invention (not illustrated) each cell 22 may be provided with only three bidirectional data, data valid and data accepted communications lines for communicating with each adjacent cell. However, such bidirectionality implies that a rigorous protocol scheme be imposed upon each cell to prevent two adjacent cells from simultaneously attempting to communicate data to one another. The advantage, of course, is that fewer signal lines are required or, alternatively, that more cells may be interconnected together using the same number of lines.

As can be appreciated from the above described data transmission scheme, the asynchronous, "handshaking" nature of the scheme results in the elimination of data transmission errors due to overruns and misframing. Each cell so communicating is state locked to the other, the completion of a bit transmission being suspended until the receiving cell indicates receipt of the data bit. Furthermore, if the transmitting cell suspends further transmission until the receiving cell deasserts its associated data accepted line (for example DACPOL*), the transmitting cell can be assured that the receiving cell is once again in a state suitable for the reception of data. Of course, each of the cells 22 within a given PA20 may communicate with one or more adjacent cells substantially simultaneously by continuously polling the various communications lines. A flow chart of a computer program which is operable to transmit and receive a data bit, in the manner described above, is shown in FIG. 7.

As has been previously mentioned, one feature of the present invention is the capability of each cell 22 within a PA 20 to communicate in a simple fashion with the control processor CDP 12. Referring now to FIGS. 9 and 10 in conjunction with FIGS. 3 and 4, an example of such a communication scheme will now be described.

Referring first to FIG. 4 it can be seen that a typical cell 22 within a given PA 20 has a reset (RST) input connected to the CDP 12 generated SYNC 34 signal, an interrupt (INT) input connected to the CDP 12 generated attention (ATTN) 24 signal, and an I/O input pin (PA6) connected to the CDP 12 generated CONTROL* 36 signal line. In addition, each cell 22 has an output I/O pin (PA7) for driving the SYSOUT* 38 signal, which signals are combined by being, for example, ORed together within a given PA 20 to generate the STATUS* 40 signal.

The aforementioned four signal lines implement a CDP 12/PS 14 control and communication bus of a simple, low cost nature which, in accordance with the invention, facilitates the processing control of a given PA 20 and the synchronization of data flow both within a given PA 20 and between adjacent PA 20's.

SYNC 34, when asserted, causes each cell 22 within a given PA 20 to be reset. When deasserted, each cell 22 will initiate a restart program routine. Such a routine may comprise a software subroutine which initializes RAM memory to a given condition, a software subroutine which initializes various software flags maintained in the RAM to a given condition, and a software subroutine which programs the plurality of I/O lines to be inputs or outputs. At the completion of such a restart initialization routine each of the cells 22 will, typically, be in a quiescent state. In particular, each of the cells 22 may be in a state where each is awaiting further control information from CDP 12.

Such control information may be provided, in accordance with the invention, by the ATTN 24 and CONTROL* 36 signals in conjunction with the STATUS* 40 signal.

Referring now to FIGS. 9 and 10, it can be seen that at time T1 ATTN 24 is asserted. ATTN 24 being asserted causes each of the cells 22 within a given PA 20 to enter an interrupt processing routine. Such a routine may be entered automatically if a cell 22 has cleared its internal interrupt mask bit, or may be entered by the cell periodically testing the state of the interrupt input pin and jumping to such a routine when the cell detects that the ATTN 24 signal is asserted. The interrupt processing routine is further comprised of various interrupt processing subroutines, at least one of which is operable for testing the state of the CONTROL* 36 signal to detect an assertion thereof and another subroutine which is operable for asserting the SYSOUT* 38 output signal, thereby informing the CDP 12 via the STATUS* 40 signal that the cell has detected the assertion of CONTROL 36.

As may be appreciated, a number of different communication protocols may be based upon such a signal interconnection scheme. Two such possible protocols are shown in FIGS. 9a and 9b.

As has been previously stated, at time T1 CDP 12 asserts the ATTN 24 signal line associated with a given PA 20. Each cell 22 within the given PA 20 thereafter enters an interrupt processing routine awaiting the assertion of CONTROL* 36. At time T2 CDP 12 asserts CONTROL* 36. Each cell 22 thereafter detects the assertion of CONTROL* 36 and asserts its respective SYSOUT* 38 signal. All of the SYSOUT* 38 signals within a given PA 20 are, in accordance with the invention, coupled together to generate the STATUS* 40 signal which is asserted, as at T3, when all of the SYSOUT* 38 signals are asserted. Thus, by monitoring the state of STATUS* 40, CDP 12 is assured that all of the cells 22 within the PA 20 have detected the assertion of CONTROL* 36. Thereafter, CDP 12 deasserts CONTROL* 36 at T4. Each of the cells 22 detect the deassertion of CONTROL* 36 and, at T5, deassert STATUS* 40 by deasserting their respective SYSOUT* 38 signals. CDP 12 detects the deassertion of STATUS* 40 and, if desired, once again asserts CONTROL* 36, thereby initiating another data transfer. Three such data transfers are illustrated in FIG. 9. When CDP 12 has completed such a data transfer session CDP 12 deasserts, at T6, ATTN 24 which is subsequently detected by each cell 22. At this time each cell 22 is enabled to determine the information conveyed during the data transfer session and is thereby further enabled to execute a CDP 12 desired processing sequence. In FIG. 10 there is shown in Table form several possible processing sequences which may be so invoked by the CDP 12, the desired sequence being determined by the number of assertions of CONTROL* 36 which occur during the time that ATTN 24 is asserted.

Figure 9A:
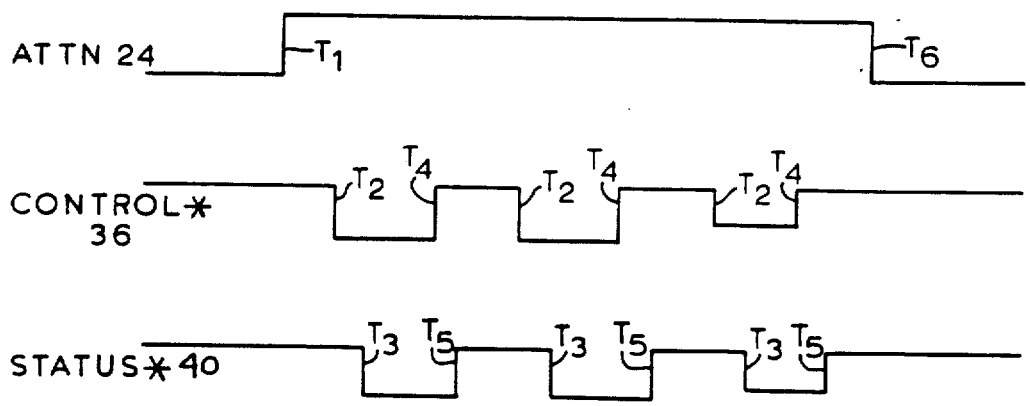
FIG. 9a is a diagram showing representative waveforms illustrative of one communication protocol for communicating control information from the control data processor to a given processing plane.
Figure 9B:
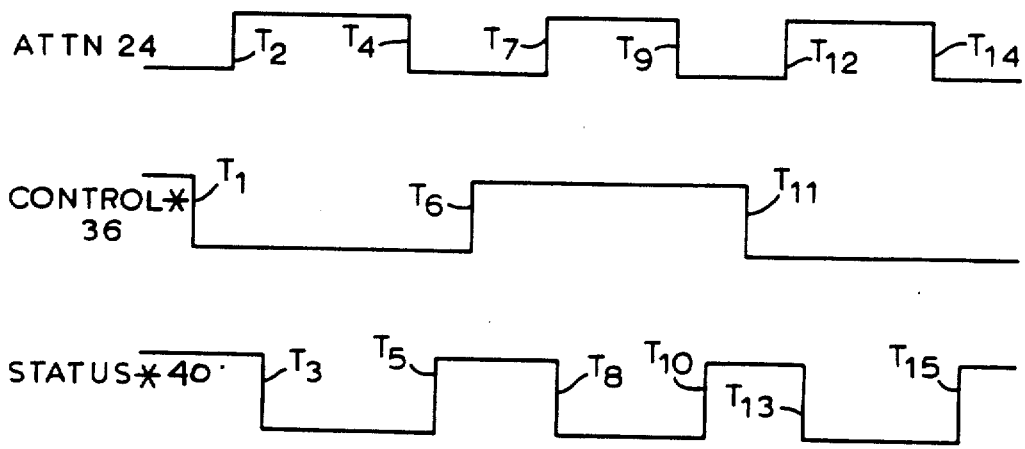
FIG. 9b is another such waveform diagram showing another communications protocol for communicating both control and data information from the control data processor to a given processing plane.

A second type of CDP 12/PS 14 communications protocol is shown in FIG. 9b, the protocol enabling the transfer of control and data information which is expressed as logical ones and zeroes. As can be seen, the ATTN 24 signal is utilized to indicate the presence of valid data upon the CONTROL 36 signal line. STATUS* 40 functions as a data accepted handshaking signal. FIG. 9b illustrates the transmission of the three bit binary pattern 010 from the CDP 12 to the PA 20. In order to accomplish this transmission CDP 12 first drives CONTROL 36 to a logic zero state at T1 and at T2 asserts ATTN 24. ATTN 24 being asserted initiates interrupt processing within each of the cells 22, thereby invoking a subroutine which reads and stores the state of the CONTROL 36 input signal. At T3 STATUS* 40 is asserted by the cells 22 in a manner described above, the assertion indicating to CDP 12 that all of the cells have read and stored the state of CONTROL 36. In response to STATUS* 40 being asserted CDP 12, at T4, deasserts ATTN 24 which causes cells 22 to deassert, at T5, STATUS* 40 thereby terminating the single bit transmission. At T6 CDP 12 drives CONTROL 36 to a logic one, at T7 CDP 12 once again asserts ATTN 24 and at T8 cells 22 assert STATUS* 40, signalling the reception of the logic one bit. The sequence thereafter, for times T9-T12, follows that as described above.

As can be realized, it is within the scope of the present invention to utilize both of the communications protocols illustrated in FIGS. 9a and 9b during the operation of system 10. For example, and referring once more to FIG. 10, six assertions of CONTROL* 36 may indicate to the cells 22 that the CDP 12 is to transmit one or more predetermined number of data words, each word being comprised of a predetermined number of data bits. As a part of this determination each cell 22 may then set a flag in memory, the logic state of the flag being indicative of which communications protocol is currently in effect. As a part of the interrupt processing routine each cell 22 may test the state of this flag in order to determine if the protocol of FIG. 9a or 9b is currently in effect. If the flag is determined to be set, the cells 22 are enabled to execute the processing subroutines necessary to implement the protocol of FIG. 9b. After reception of the predetermined number of data words each cell 22 may reset the flag. Thereafter, and upon a subsequent assertion of ATTN 24 the cells 22 would determine, due to the flag being reset, that the protocol of FIG. 9a is once more in effect. Of course, the number of data words may not be predetermined but, instead, may be specified by CDP 12 during the subsequent transmission. Thus, transmissions comprised of varying numbers of data words may be easily accommodated.

At this time it should be apparent that the system and method of the invention provide for a minimum complexity, low cost, and inherently flexible data processing system. Based upon the foregoing description of the preferred embodiment of the invention a number of additional, valuable features accruing from the use of the invention will now be described, it being understood that these additional features are representative only.

Although the CDP 12 has been described above as communicating data and control information simultaneously to all of the cells 22 within a PA 20, the invention also provides for the selective transmission of data or control information to an individual one or ones of the cells 22 within a given PA 20.

Figure 13:
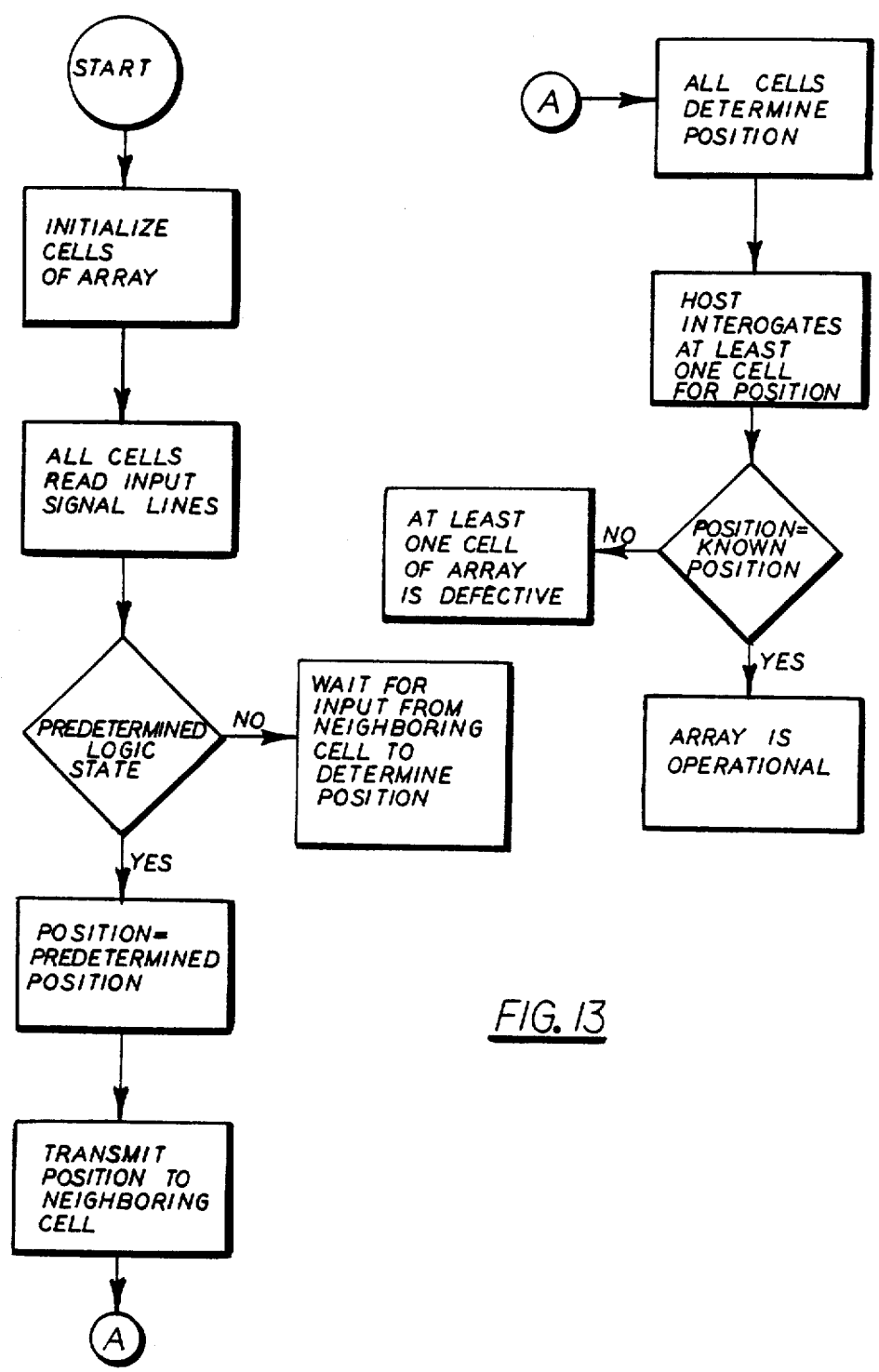
FIG. 13 is a flowchart illustrating a method of the invention.

Referring once more to FIGS. 2, 5c and the flow chart of FIG. 13, it can be seen that those cells disposed along edges of a PA 20 may have certain of their communication control lines coupled to a constantly enabling voltage level. Thus, during cell 22 initialization those cells along edges of the array may determine such by the state of these lines. Furthermore, those cells located at a corner of the array may have two sets of control lines coupled to enabling voltage levels. For example, the cell 22 shown in the upper left corner of the array of FIG. 2 may have the DVALIL*, DACPIL*, DVALIU* and DACPIU* control lines all connected to a circuit ground. If as part of the initialization sequence each cell 22 reads the state of these lines, only the cell 22 in the upper left corner will detect this condition. Thus, this cell 22 may determine that it is located at the row one, column one (1,1) position. If this cell then transmits its position to those cells adjacently disposed to the right and to the bottom, these cells may then determine that they are located at the row one, column 2 (1,2) and row 2, column 1 (2,1) positions, respectively. If these cells then communicate their positions to adjacent cells eventually each cell 22 within the array will be apprised of its location within the array. Subsequently, CDP 12 may specify as part of the data transmitted to the array which cell or cells are to receive the data. Although all of the cells 22 within the PA 20 will receive this cell specific data, only those cells specified by the CDP 12 will store or otherwise utilize the data.

This inherent ability of the cells 22 to determine their relative positions within the array results further in enabling the CDP 12 to detect the presence and location of a malfunctioning cell, thereby providing for a rapid diagnostic determination of a PS 14 malfunction. For example, if one or more of the cells 22 disposed along the right edge of the PA 20 shown in FIG. 2 have their right side communication signals coupled to CDP 12, CDP 112 may interrogate these cells to determine their position data. If the positional data received by the CDP 12 does not reflect the true, predetermined position of the cell or cells, then the CDP 12 may determine, based upon the cell's believed position versus its actual position, which cell within the array failed to provide positional data to adjacent cells, In order to interrogate this cell or cells, CDP 12 may be provided with circuitry operable for being coupled to the inrtercell communication bus. Such circuitry may comprise a variety of types of logic circuits which, based upon the above described description of the operation of the intercell communications bus, may be readily fabricated by those skilled in the computer arts.

Figure 8:
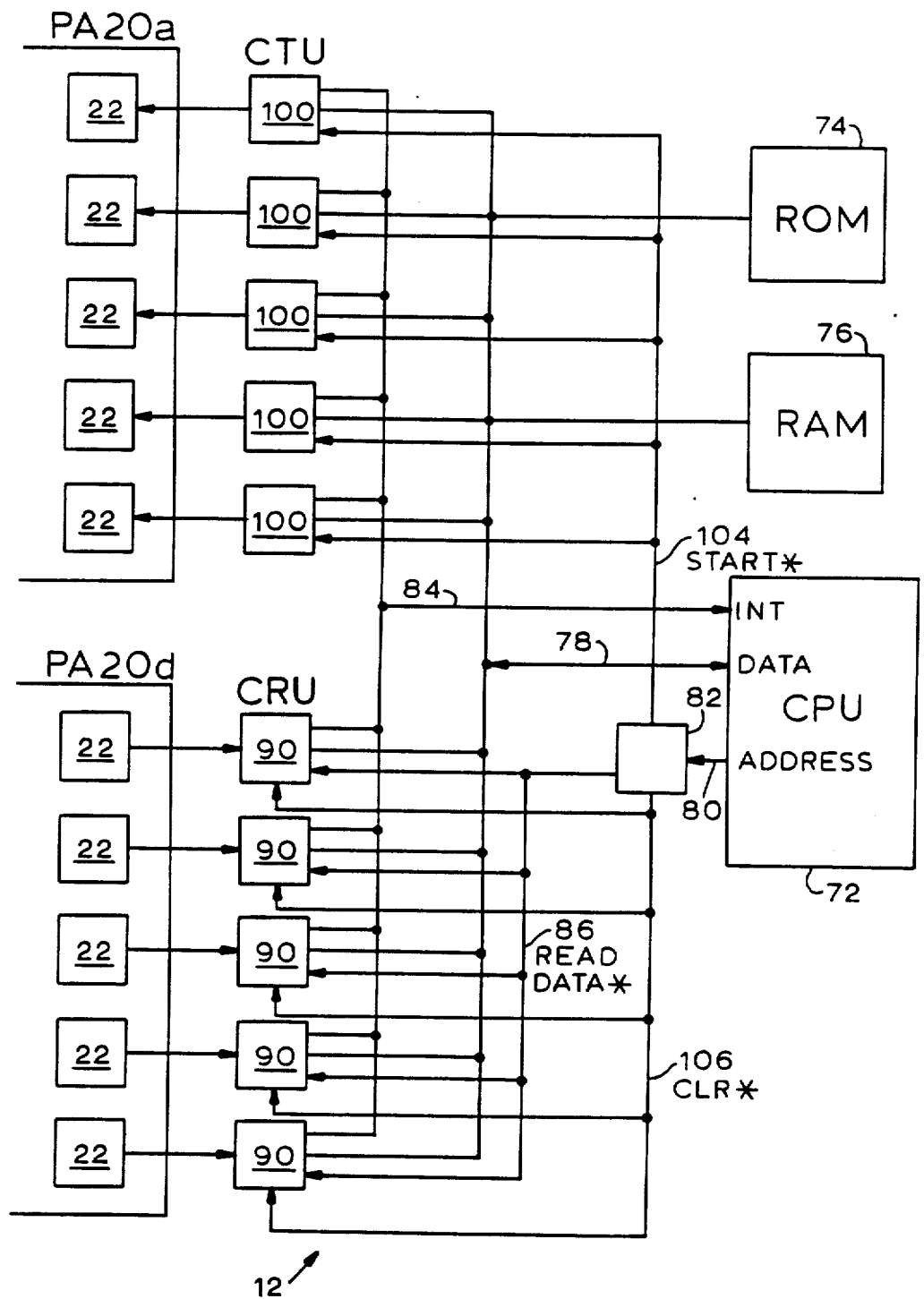
FIG. 8 is a block diagram illustrating one embodiment of a control data processor.
Figure 11:
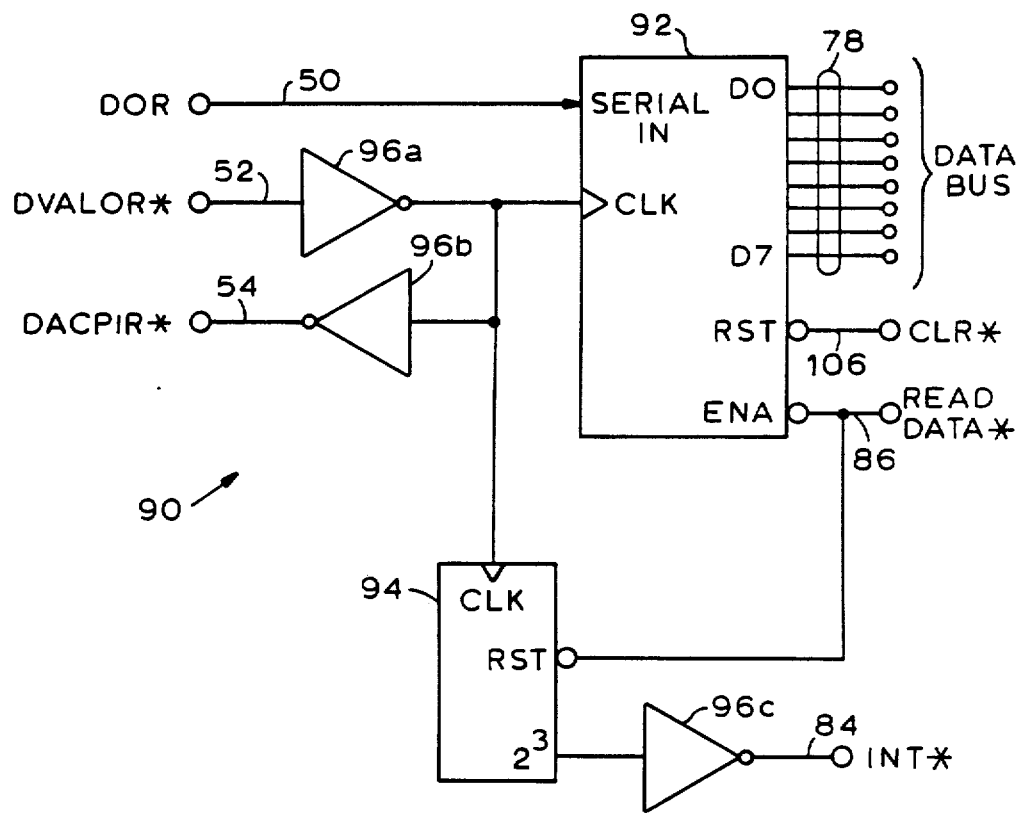
FIG. 11 is a schematic diagram showing one embodiment of circuitry operable for coupling the control data processor for the transmission of data to a cell.
Figure 12:
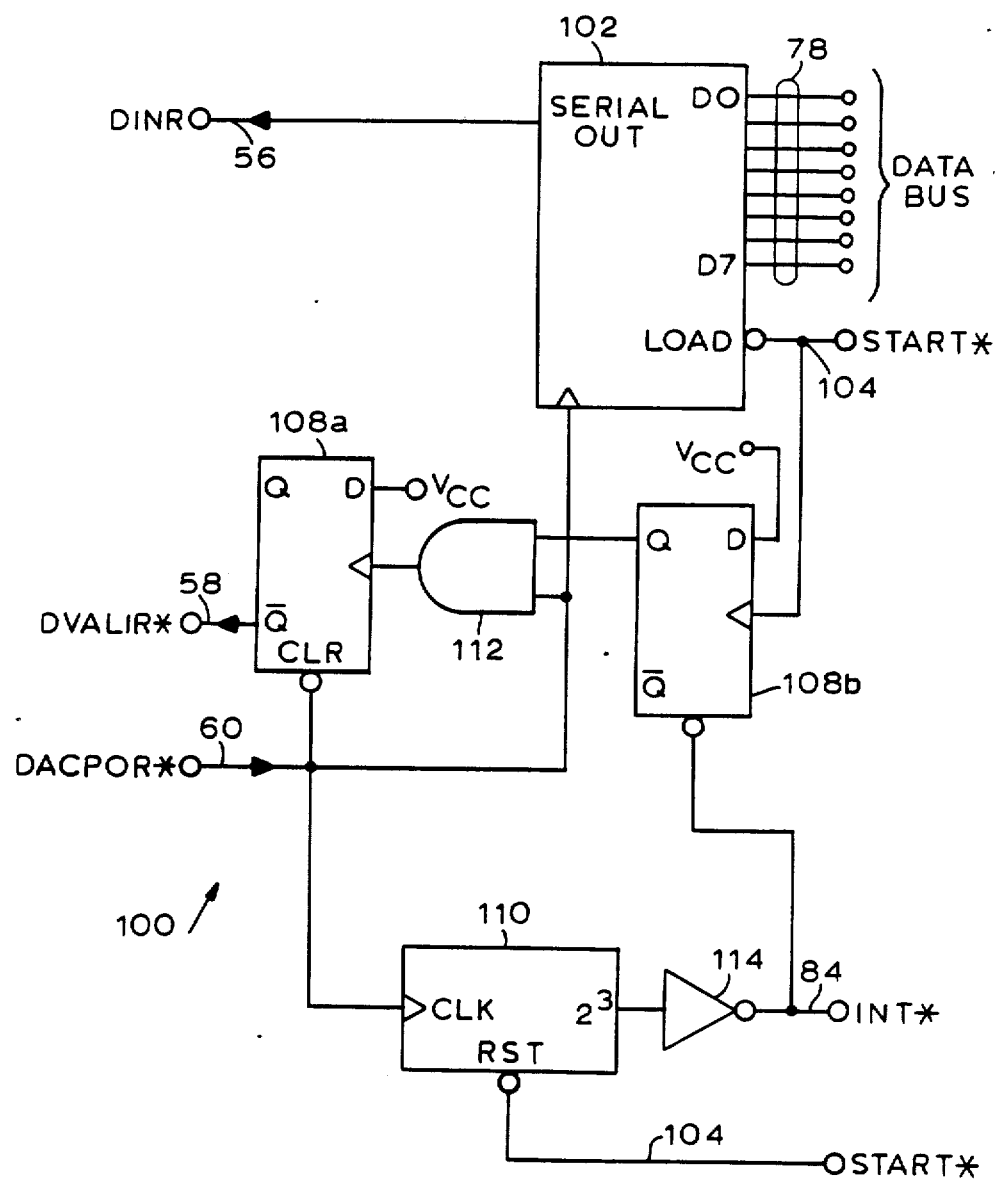
FIG. 12 is a schematic diagram showing one embodiment of circuitry operable for coupling the control data processor for the reception of data from a cell.

Referring now to FIG. 8 in conjunction with FIGS. 11 and 12 there is shown one possible embodiment of CDP 12 and circuitry suitable for the transmission and reception of data to and from a cell 22.

CDP 12 is comprised of a central processing unit (CPU) 72 having an associated data bus 78, address bus 80 and an interrupt bus 84. Coupled to data bus 78 may be ROM and RAM memory devices 74 and 76, respectively. Also coupled to address bus 80 may be an address decode 82 logic unit which is operable for decoding the address and control signals (not shown) of CPU 72 in order to provide a plurality of device select signal READ DATA* 86, START* 104 and CLR* 106. These device select signals are coupled to a plurality of cell transmit units (CTU) 100 and cell receive units (CRU) 90, as is the data bus 78 and interrupt bus 84. Each one of the CTU 100 is coupled to a cell 22 within the PA 20a, the cells 22 being disposed along an edge of the PA 20a, such as the right edge. Each of the CRU 90 is similarly coupled to cells 22 disposed along an edge of the PA 20d. This coupling scheme permits the CDP 12 to transmit data to the cells 22 within the topmost PA 20 of PS 14 and to receive data from the bottommost PA 20. Of course, each of the PA 20 within PS 14 may be so coupled to CDP 12, the manner and degree of coupling being often application dependent.

Referring now to FIG. 11 there is shown a representative one of the CRU 90 which can be seen to be substantially comprised of a serial data in/parallel data out shift register 92, a binary counter 94 and inverters 96. A parallel data output of register 92 is coupled to data bus 78 and a parallel data out enable input is coupled to READ DATA* 86. A serial data input of register 92 is coupled to the DOR 50 of a cell 22. A shift register clock signal is provided by inverter 96a from the DVALOR* of cell 22, the rising edge of the clock signal being operable for transferring the logic state of DOR 50 into the register 92. Inverter 94b has an output coupled to the DACPIR* 54 input of cell 22, whereby a substantially immediate data accepted condition is returned to the cell 22 upon the cells assertion of DVALOR* 52. The output of inverter 94a is also coupled to the clock input of counter 94 such that each assertion of DVALOR* 52 causes counter 94 to increment by one count. If it is assumed that a cell 22 transmits data in packets of eight bits, then the $2^3$ count output of counter 94 is indicative, when asserted, of the occurrence of eight assertions of DVALOR* 52.

This output of counter 94 is inverted by inverter 96c and applied to the interrupt bus 84 of CPU 72. The assertion of INT* 84 causes CPU 72 to assert the READ DATA* 86 signal, which assertion results in the contents of register 92 being placed on data bus 78 and the simultaneous reset of counter 94 to a zero condition. Thus, the CPU 72 is enabled to receive a data word from the cell 22. A CLR* 106 signal which is operable to clear register 92 may also be provided.

Referring now to FIG. 12 it can be seen that a representative CTU 100 is comprised of a parallel in/serial out shift register 102, a pair of D-Flip/Flops (F/F) 108 and a binary counter 110. Also, the CTU 100 is comprised of AND gate 112 and inverter 114. Register 102 is coupled to data bus 78 and START* 104 such that an assertion of START* 104 is operable for storing a byte of data within the register 102. The assertion of START* 104 also sets F/F 108b, thereby setting F/F 108a and resulting in DVALIR* 58 of a cell 22 being asserted, the DIR 56 of cell 22 being driven by the serial output of register 102. The assertion of START* 104 also clears counter 110 to a zero count condition. The assertion of DVALIR* 58 is maintained until cell 22 responds by asserting DACPOR* 60, at which time F/F 108a is reset, deasserting DVALIR* 58. The rising edge of DACPOR* 60 applies a shift pulse to the clock input of register 102, increments counter 110 and subsequently reasserts DVALIR* 58, through AND gate 112, by once more setting F/F 108a. After eight such assertions of DACPOR* 60 counter 110 is enabled to assert INT* 84, the assertion of which resets F/F 108b, thereby disabling the clock input to F/F 108a. Thus, a data word is transmitted to a cell 22.

As can be appreciated, a parallel data processing system constructed in accordance with the invention is well suited for a number of data processing tasks. For example, a system constructed in accordance with the teaching of the invention is well suited for image processing applications. In such a system the cells 22 disposed within the topmost PA 20 may have their top intercell communication lines coupled to the output of a corresponding analog-to-digital converter which in turn is coupled to the analog output of a photodetector. The data received by the top-most cells would be data indicative of the radiation received by an array of such photodetectors, each of the photodetectors within the array providing one or more pixels of image information. Each subsequent plane of the PS 14 may process the data received from an overlying plane in order to perform various well known image processing and recognition algorithms. As a representative example, some planes may employ Laplacian operators to determine the edges of objects appearing in the visual field of the photodetectors, other planes may employ filtering techniques to smooth the edges so determined by overlying planes, other planes may rotate the edges in two or more dimensions, while other planes may enlarge or contract the field of view, and so on. In order to accomplish these functions, each cell 22 within a given PA 20 may be required to process one or more pixels of image data and communicate data indicative of pixel intensity and other features to adjacent coplanar cells. Communication between adjacent planes enables a plurality of temporally distinct views of a scene to be processed simultaneously within the PS 14.

Another application for a PDPS system constructed in accordance with the invention is in the modeling of neural networks or neural nets, such as, for example, the well known perceptron model of an adaptive visual system. In such a system the intercell communication busses may represent the synapatic connectivity within a given layer of a nervous structure, such as the visual cortex, while the communication between adjacent planes may correspond to the synaptic connectivity between adjacent cellular layers of the cortex. Such synaptic characteristics as hyperpolarization, adaptation, oscillatory firing and other well known features may be realized by suitably programming each of the cells 22. Communication with the CDP 12 may be employed for overall control and monitoring of the neural processing occurring within the PS 14, such as the adjustment of weighting values applied to perceived image areas.

Thus, the invention should not be considered to be limited to the embodiments disclosed herein but, instead, should be considered to be limited only as defined by the following claims.

What is claimed is:

1. In a parallel data processing system comprised of at least a two dimensional array of data processing cells, each of the cells comprising a plurality of input and output communication signal lines for electrically coupling to at least all immediately neighboring cells, at least one cell disposed at a unique position at an edge of the array having input communication signal lines coupled to a predetermined logic state, a method of determining by the control data processor that at least one of the cells of the array is inoperable, the method comprising the steps of:

initially resetting the cells of the array to a common processing state;
   determining by each of the cells a position of the cell within the array, the step of determining a position including the steps of:
   initiating an input signal line logic state determination processing state within all of the cells of the array;
   detecting, by the at least one cell at the edge of the array, the predetermined logic state;
   determining from the detected predetermined logic state that the cell is located at the unique position within the array;
   communicating the position of the cell to at least one other neighboring cell whereby the cell so communicated to is enabled to determine its position within the array relative to the unique position of the cell disposed at the edge of the array, each of the cells within the array communicating its relative position to at least one neighboring
   cell until each of the cells within the array has determined its position relative to the unique position;
the method further comprising the steps of:
   transmitting the position of at least one cell to the control data processor;
   comparing the transmitted position to a known position of the at least one cell; and
   determining that at least one cell of the array is inoperative if the transmitted position does not equal the know position.

2. A method as set forth in claim 1, wherein each of the cells comprises data processing means and wherein the step of initially resetting is accomplished by the control data processor simultaneously asserting an enabling logic state at a reset input of each of the data processing means.

* * * * *